July 10, 1923.
A. L. HOLTON
1,461,353
LIFTING JACK FOR MOTOR VEHICLES
Filed June 12, 1922
2 Sheets-Sheet 2
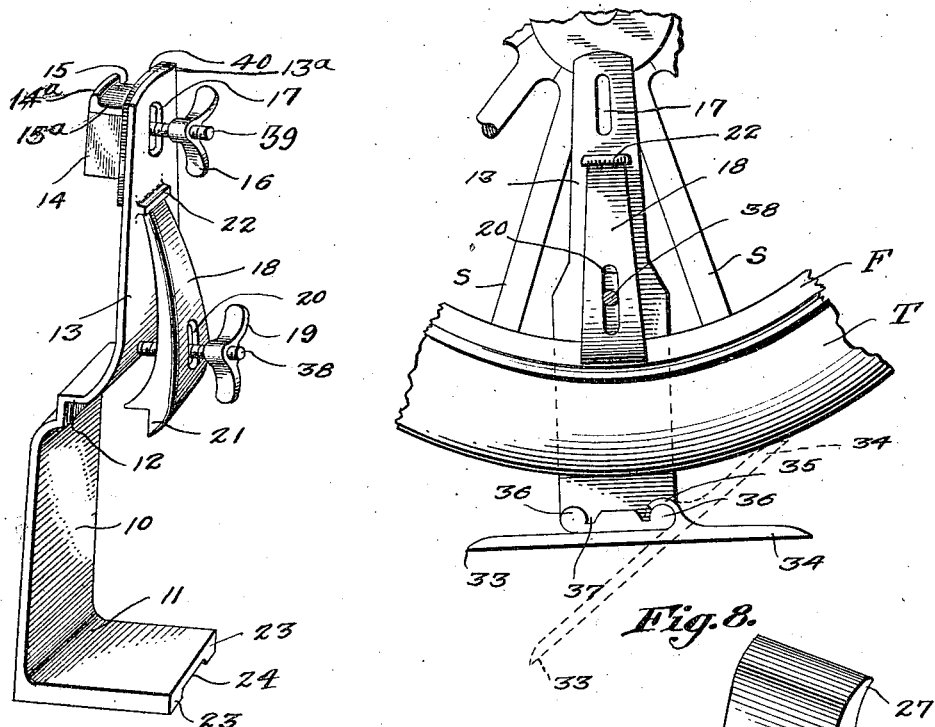
Inventor.
Abner L. Holton Patented July 10, 1923.

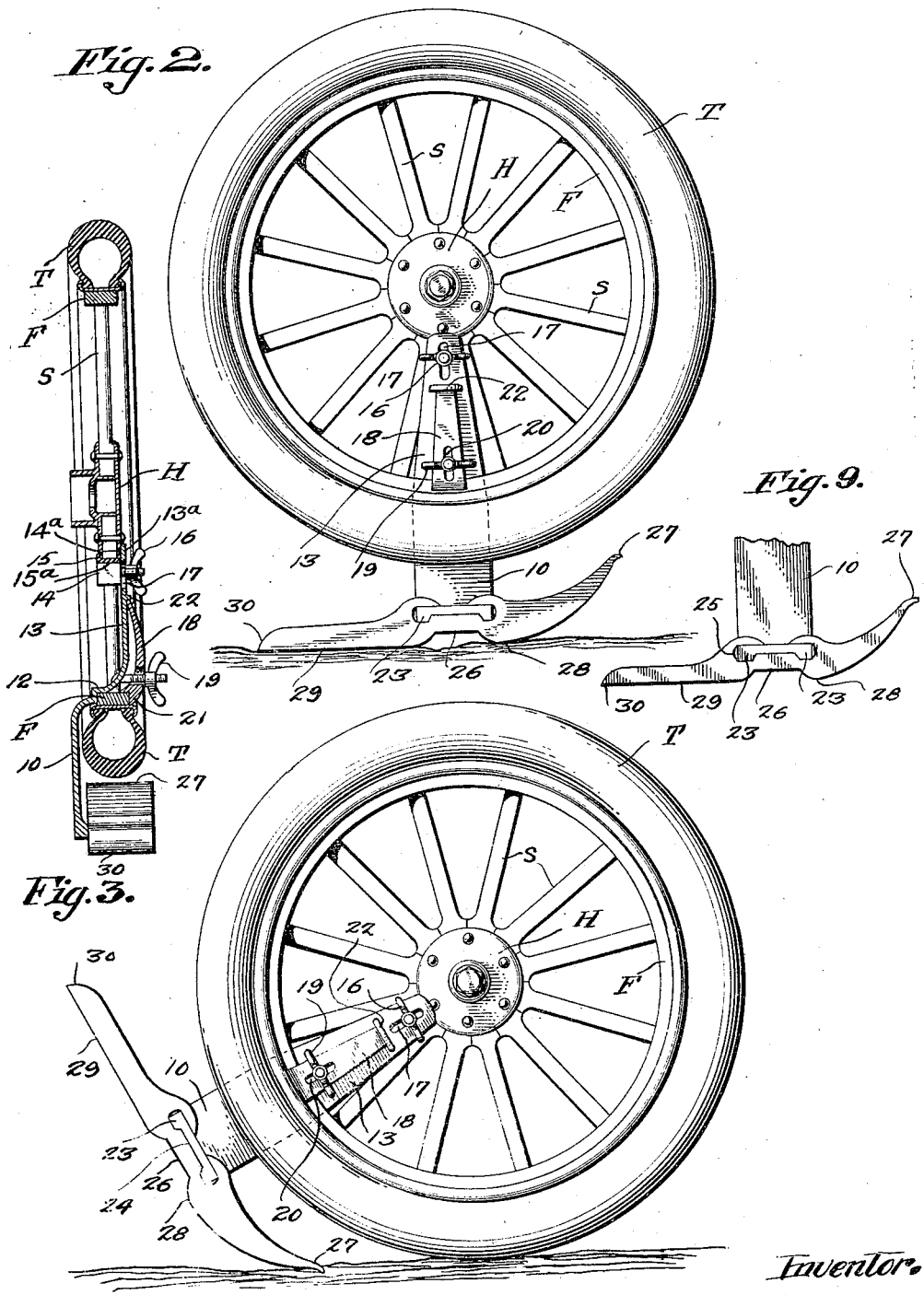

1,461,353

UNITED STATES PATENT OFFICE.

ABNER L. HOLTON, OF BIG STONE GAP, VIRGINIA.

LIFTING JACK FOR MOTOR VEHICLES.

Application filed June 12, 1922. Serial No. 567,691.

*To all whom it may concern:*

Be it known that I, ABNER L. HOLTON, a citizen of the United States, and a resident of Big Stone Gap, in the county of Wise and State of Virginia, have invented certain new and useful Improvements in Lifting Jacks for Motor Vehicles, of which the following is a specification.

This invention relates to a lfting jack for motor vehicles or the like.

The invention more particularly relates to the type of lifting jack in which the motive power of a vehicle is utilized for elevating one or more of its wheels and has for its object to provide such a device which may be quickly and easily applied to either a rear or front wheel of a motor vehicle and serve to elevate such wheel a predetermined degree when the motor vehicle is advanced or moved rearward a sufficient degree.

It is also an important object of the invention that the lifting device when applied to a wheel of a motor vehicle for elevating the same that no part of the wheel will be subjected to an undue strain.

It is a further object of the invention that the device be adapted to in no way mar or scratch a wheel to which the same may be applied for lifting said wheel.

It is also within the scope of the invention that the device be extremely simple in construction and inexpensive to manufacture.

Other objects and advantages relating to details of construction, combination and arrangement of parts will hereinafter appear.

The invention is illustrated by way of example in the accompanying drawings, in which:—

Figure 1 is a view of the front wheel of an automobile illustrating the application of the lifting device to a front wheel previous to lifting the front wheel.

Figure 2 shows the relative position of the lifting device and wheel after the car has been moved forward and the wheel elevated.

Figure 3 is a fragmentary front elevation of the view shown in Figure 2 and with part of the automobile wheel broken away to more clearly illustrate the application of the invention.

Figure 4 is a detailed perspective view of that portion of the lifting device from the base or portion that comes in contact with the ground, up to the top.

Figure 5 is a detailed perspective view of a separate base to be attached to and used in connection with that part of the invention shown in Figure 4.

Figure 6 is a detailed perspective view of a base differently constructed from the one shown in Figure 5.

Figure 7 is a detailed perspective of the lower portion of Figure 4 constructed so as to permit the use of the base shown in Figure 6.

Figure 8 shows in detail how the base illustrated in Figure 6 is attached to and used as a part of my invention.

Figure 9 shows in detail how the base illustrated in Figure 5 is attached to Figure 4.

Referring to the drawings more particularly, T represents the tire of an automobile wheel, F the felly of the wheel and S the spokes. H indicates the hub of the wheel.

In carrying out the present invention there is provided a body member 10, which is preferably of the width shown in Figure 4, with one straight piece 11 at the bottom which extends substantially at right angles to the body member 10 and another piece 12 at the top of the body member 10 extending at substantially right angles but forming a square shape, the body member 10 and piece 11 and piece 12 forming a substantially U-shaped shoe or yoke to fit about the felly and tire of a motor vehicle wheel. Piece 12 also has extending therefrom at substantially right angles to the piece 12, an arm 13 having an oblong slot 17 near its upper extremity. This arm 13 also has extending at right angles to it a threaded bolt 38. On the inner side of the arm 13, near the top, and surrounding the oblong slot or hole 17 there is a sheet of rubber 40. Attached to the arm 13 is a rectangular shaped lug 14, having a rounded portion at the top covered with rubber 15. The top of this lug 14, Figure 4, in combination with arm 13, Figure 4, forms a U, 14ª being one leg of the U and 13ª being the other leg of the U and 15ª the bottom of the U. The lug 14 is held to arm 13 by a threaded bolt 39 and wing nut 16, the bolt 39 being passed throwgh the oblong hole 17 and the wing nut 16 then tightened. On the outside of arm 13 an upright piece or latch 18 is provided with a square shoulder 21 at its lower end and having an oblong hole 20 through which the bolt 38 is passed. A wing nut 19 is provided to hold this upright piece 18 in the desired position. About half way to the top of arm 13 a small knob or lug 22 is provided, under which latch 18 sets and which knob 22 acts as a brace. This operation will be more fully described later.

The straight piece 11 is so constructed as to permit the use of it as the ground engaging means of the device, therefore the bottom is hollowed out at 24, Figure 4, leaving flat bearing surfaces 23 on each side. This arrangement will work all right on hard ground or paved surfaces but on account of body member 10 being necessarily narrow enough so as to permit of its being passed between the spokes S of the wheel, it will not answer the purpose on soft ground because the operator cannot tell when his lifting device is straight up, and thus stop his car at the desired place. To overcome this trouble I have provided two separate bases as a part of this invention, either or which may be used as preferred. Figure 5 shows one and Figure 6 shows the other. Figure 5 is provided with two slots 25 and a curved portion on one side, 27 to 28. This base is hollowed out at 26, the underside making the point of contact when the wheel is jacked up at 28 and 29. On the opposite side of this base from the curved side is a flat portion 29 and this flat portion 29 is made relatively long. When the operator drives his car ahead the first point of contact with the ground is at point 27 and the last point of contact with the ground on the curved side is at point 28 and then point 29, the flat base, makes solid contact with the ground indicating that the jack is in vertical position. If the operator tries to force his car ahead after point or base 29 contacts with the ground then the next bearing surface is at point 30. As point 28 and 29 leaves the ground the engine necessarily pulls heavier and the car is also raised relatively higher than it should be indicating to the operator quickly and effectively just when to stop his engine to prevent the wheel turning all the way over point 30. This base is shown slipped on to 11 in Figure 9. Bearing surface 29 could be made long enough to prevent the wheel from moving beyond the upright position of the jack.

In Figure 6 another base is shown and by reference to Figures 7 and 8 it will be readily seen how this base is to be operated. In Figure 7 a portion of the straight piece 10 is shown and extending from same at right angles a substitute piece 41 which takes the place of the straight piece 11 shown in Figure 4. Piece 41 Figure 7 is made with a ¾ round bearing 36 on each side, this being accomplished by hollowing out portions 37 and top of 41, leaving the center flat, 41, and the round bearings 36 on each side. The base shown in Figure 6 has a curved arch portion 35, the arched portion extending over to point 32 leaving the hollow portion 31 which may be slipped on the rounded bearings 36, Figure 7 and as shown in Figure 8. When this base is slipped on to the rounded bearing 36, and before the car is moved forward the weight in the direction of the point 33 being heavier than in the direction of point 34 it necessarily drops down to the position indicated by dotted lines in Figure 8 throwing one side of the base in contact with the tire T of the wheel. The full line in Figure 8 shows the wheel jacked up and the base flat on the ground. The dotted lines show the position of the base when it is slipped on the rounded bearing 36 and before the car is moved ahead. As the wheel is moved forward the base being in the position of the dotted lines, Figure 8, forms a bridge and the tire T rides this bridge until it passes the center of the rounded bearing 36 when the weight of the car forces it back to the position of the full lines, Figure 8. If the car is driven forward after the position of the solid lines is attained none of the base comes in contact with the ground except point 33. To lift the wheel over this point it takes extra power which immediately indicates to the operator that it is time to stop his engine because the jack is then straight up and the tire T clear of the ground ready to be taken off. Special attention is called to the construction of these bases; in the operation of the device the function they perform is very important.

When it is desired to use the present lifting device the same should be applied as shown in Figure 1. The body member 10, Figure 4 has been inserted between a pair of spokes S, and the lug 14 brought up to contact with the hub H between the spokes S as shown in Figure 3. When this is done leg 14$^a$ contacts the wheel on the inside slightly above the upper end of the spokes; leg 13$^a$ contacts the outer face of the wheel near the upper extremity of the spokes and the bottom of the U 15$^a$ contacts the wheel in the crotch of the spokes. The square part of piece 12 Figure 4 rests on the felly F of the wheel as shown in Figure 3, then the latch 18 is set under the knob or lug 22, and the square portion 21 is set on the felly F of the wheel, and wing nut 19 is turned tight until the squares 12 and 21 clamp the felly F of the wheel on both sides holding the device rigid. After this is done the lug 14 Figure 4 is pushed into close contact with the hub H Figure 3 by taking hold of the threaded bolt 39 Figure 4 and the wing nut 16 tightened to prevent lug 14 from slipping to the bottom of the oblong hole 17, Figure 4.

When wing nut 16 is tightened leg 14ª and 13ª grips the wheel and prevents the device from slipping off the wheel.

After the device is so attached to the wheel the base, Figure 5, is slipped on piece 11. The car is then moved forward riding easily over the rounded portion of the base 27 and 28. If this rounded or curved portion 27 to 28, Figure 5, was not provided and each side of the base was flat the point of contact with the ground would be very much further away from the tire T and it would take greater power to make the wheel raise to the right elevation, and there would be more chance of it going on over instead of stopping when the jack is vertical. It will also be seen that the weight of the car is thrown on the lug 14 which is padded on top with rubber or felt 15.

What I claim is:

1. In combination with a motor vehicle wheel a device consisting of a substantially U-shaped shoe or yoke adapted to be fitted about the tire and felly of said motor vehicle wheel, having an arm extending from the upper leg of the shoe or yoke at substantially right angles thereto, the arm having an elongated hole near the top through which to pass a threaded bolt, said bolt having on one end a wheel supporting lug and on the opposite end a thumb nut; and a latch to fasten the device to the wheel.

2. In combination with a motor vehicle wheel, a device consisting of a substantially U-shaped shoe or yoke to be fitted about the tire and felly of said wheel, and extending from the upper leg of the shoe or yoke at substantially right angles thereto, an upright arm with a wheel supporting lug at right angles to said arm, a threaded bolt at right angles to said arm, a latch on the threaded bolt and a wing nut behind the latch, said bolt latch and wing nut to be used to clamp the device to the wheel as described.

3. A device of the character described comprising a substantially U-shaped shoe or yoke having extending from one side a supporting arm with a wheel supporting member at right angles to the arm, said supporting member and the arm forming a U to contact the wheel of the motor vehicle in the crotch of the spokes, and both sides of the wheel slightly above the crotch of the spokes for the purpose described.

4. A device having a supporting arm with a threaded bolt at right angles to said arm; a latch on the threaded bolt, the lower end of said latch to contact the outer edge and top of the felly of the wheel of a motor vehicle, an elongated hole in the lower half of the latch through which to pass the threaded bolt, the upper end of said latch to contact the supporting arm to hold said device in rigid contact with a motor vehicle wheel as described.

5. A wheel elevating device comprising a substantially U-shaped shoe or yoke to fit about the tire and felly of the wheel, having an arm extending from the upper leg of the shoe or yoke at substantially right angle thereto, said arm having a wheel supporting lug on one side, the lower leg or ground engaging member of said shoe or yoke having two three-quarter round bearings on the top side directly opposite each other and a separate base to fit on the said bearings in the manner described.

6. A wheel elevating device comprising a substantially U-shaped shoe or yoke to fit about the tire and felly of the wheel, having an arm extending from the upper leg of the shoe or yoke at substantially right angles thereto, said arm having a wheel supporting lug on one side and a separate base to slip on the ground engaging member of the shoe or yoke for the purpose described.

7. In combination with a motor vehicle, a lifting device, a U-shaped shoe or yoke, part being disposed on the inner side of the tire, the upper leg of the shoe or yoke passing between the spokes and coming in contact with the felly of the wheel, with an arm extending from the upper leg of the shoe or yoke said arm paralleling the outside of the spokes and extending to a point opposite the outer face of the hub of the wheel, the arm having on its inner side a wheel supporting lug extending at right angles to the arm and disposed between the spokes and arranged to contact with the wheel at the upper extremity of the spokes for the purpose described.

ABNER L. HOLTON.